United States Patent [19]

Maresca et al.

[11] Patent Number: 4,798,874

[45] Date of Patent: Jan. 17, 1989

[54] THERMOPLASTIC BLENDS COMPRISING POLYCARBONATE RESIN AND AMORPHOUS POLYAMIDE

[75] Inventors: Louis M. Maresca, Pittsfield; Donald C. Clagett, Lincoln; Uwe S. Wascher, Pittsfield, all of Mass.

[73] Assignee: General Electric Company, Pittsfield, Mass.

[21] Appl. No.: 183,308

[22] Filed: Apr. 11, 1988

Related U.S. Application Data

[63] Continuation of Ser. No. 812,433, Dec. 23, 1985, abandoned.

[51] Int. Cl.⁴ .................... C08L 69/00; C08L 77/00
[52] U.S. Cl. .................................. 525/425; 525/433
[58] Field of Search ........................ 525/425, 433

[56] References Cited

U.S. PATENT DOCUMENTS

| | | | |
|---|---|---|---|
| 2,288,282 | 6/1942 | Huismann | 568/33 |
| 2,739,171 | 3/1956 | Linn | 568/638 |
| 2,999,835 | 9/1961 | Goldberg | 524/267 |
| 3,028,365 | 4/1962 | Schnell et al. | 528/196 |
| 3,148,172 | 9/1964 | Fox | 528/196 |
| 3,225,114 | 12/1965 | Chapman et al. | 525/433 |
| 3,334,154 | 8/1967 | Kim | 525/469 |
| 3,884,882 | 5/1975 | Caywood, Jr. | 525/205 |
| 3,946,090 | 3/1976 | Margotte et al. | 525/433 |
| 4,018,750 | 4/1977 | Onizawa | 525/351 |
| 4,123,436 | 10/1978 | Holub et al. | 524/289 |
| 4,131,575 | 12/1978 | Adelmann et al. | 524/311 |
| 4,147,740 | 4/1979 | Swiger et al. | 525/263 |
| 4,174,358 | 11/1979 | Epstein | 525/183 |
| 4,251,644 | 2/1981 | Joffrion | 525/64 |
| 4,317,891 | 3/1982 | Sakano et al. | 525/66 |
| 4,346,194 | 8/1982 | Roura | 525/66 |
| 4,430,484 | 2/1984 | Quinn | 525/433 |
| 4,474,927 | 10/1984 | Novak | 525/66 |
| 4,536,541 | 8/1985 | Latham | 525/66 |

FOREIGN PATENT DOCUMENTS

| | | | |
|---|---|---|---|
| 3332924A | 9/1983 | Fed. Rep. of Germany | 525/433 |
| 51030255 | 9/1974 | Japan | . |
| 51054657 | 11/1974 | Japan | . |
| 55050061 | 10/1978 | Japan | . |
| 55-142049 | 4/1979 | Japan | . |
| 55-25467 | 2/1980 | Japan | 525/433 |
| 55-133446 | 10/1980 | Japan | 525/433 |
| 50001147 | 5/1983 | Japan | . |
| 59-68368 | 4/1984 | Japan | 525/433 |
| 59-113049 | 6/1984 | Japan | 525/433 |

OTHER PUBLICATIONS

Pillon et al., "Compatibilization of Polyester/Polyamide Blends via Catalytic Ester-Amide Interchange Reactions", Polymer Engineering and Science, vol. 24, No. 17, 1300–1305 (1984).

Pillon et al., "A Study of Ester-Amide Interchange Reaction in the Poly(ethylene terephthalate) Poly(amide-6,6) System", Polymer Process Engineering, 4(2-4), 375–387 (1986).

Konyukhova et al., "Methods of Investigation–Calorimetric Study of Copolymers Obtained by Interchain Exchange Reaction of Polybutyleneterephthalate with Polyamides", Polymer Science, U.S.S.R., vol. 26, No. 3, pp. 716–722 (1984).

Fakirov, "Heterochemical Healing in Linear Polycondensates", Polymer Communications, vol. 26, pp. 137–139 (1985).

Gallucci et al., J. Appl. Poly. Sci., vol. 27, pp. 425–437 (1982), "Preparation and Reactions of Epoxy-Modified Polyethylene".

Primary Examiner—John C. Bleutge
Assistant Examiner—A. Carrillo

[57] ABSTRACT

Thermoplastic blends of amorphous polyamide with a resin selected from the group consisting of polycarbonate, poly(ester-carbonate), and polyarylate have excellent physical properties.

10 Claims, No Drawings

THERMOPLASTIC BLENDS COMPRISING POLYCARBONATE RESIN AND AMORPHOUS POLYAMIDE

This is a continuation of co-pending application Ser. No. 812,433 filed on Dec. 23, 1985 now abandoned.

The present invention relates to thermoplastic resin blends containing an amorphous polyamide resin and a polyester or polycarbonate resin. More particularly, the present invention relates to thermoplastic resin blends containing an amorphous polyamide resin and at least one resin selected from the group of polycarbonate, poly(ester-carbonate), and polyarylate.

BACKGROUND OF THE INVENTION

Polycarbonates, poly(ester-carbonates), and polyarylates are well known thermoplastic materials which, due to their many advantageous physical properties, find use as thermoplastic engineering materials in many commercial and industrial applications. These resins, for example, exhibit excellent properties of toughness, flexibility, impact strength, optical clarity, and heat resistance. All such resins may generally be prepared by the reaction of a dihydric phenol, such as bisphenol-A, with a carbonate precursor and/or an aromatic dicarboxylic acid.

These resins, particularly polycarbonate, have been commonly blended with other resins to produce blends having various modified properties. For example, blends of these resins with a second and even third thermoplastic resin can lead to blends which not only have the above mentioned properties but additionally have excellent properties for which polycarbonate, poly(ester-carbonate), and polyarylate may not otherwise be recognized, such as ductility, solvent resistance, and resistance to brittle failure.

For some important applications, i.e. automotive parts, it is important that such resins have enhanced chemical resistance to aggressive solvents, for example, acetone, aromatic solvents, gasoline, and the like, to a degree which may not be necessary in most other applications. Herein, it is proposed to achieve the necessary levels of solvent resistance in combination with excellent levels of other necessary properties, including transparency, by use of certain novel blends of polycarbonate, poly(ester-carbonate), and polyarylate with polyamide.

Therefore, it is an object of the present invention to produce blends containing polycarbonate, poly(ester-carbonate), and polyarylate which otherwise exhibit the desirable properties of such resins including transparency, but which also exhibit excellent solvent resistance, ductility, and resistance to brittle failure. It is also an object of the present invention to produce molded articles from blends containing the same.

DETAILED DESCRIPTION OF THE INVENTION

Briefly, according to the present invention, there are provided polyamide blends with polycarbonate, poly(ester-carbonate), and/or polyarylate having unexpectedly improved properties, i.e., solvent resistance, ductility, and resistance to brittle failure which blends comprise:

(i) at least one resin selected from the group consisting of polycarbonate, poly(ester-carbonate), and polyarylate; and (ii) amorphous polyamide resin.

Unlike blends with crystalline nylons, these products are substantially transparent when other miscible additives are present.

Polycarbonate resins suitable for use herein can be prepared by reacting a dihydric phenol with a carbonate precursor, such as phosgene, a haloformate or a carbonate ester. Generally speaking, such carbonate polymers may be typified as possessing recurring structural units of the formula:

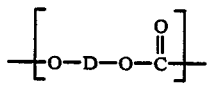

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. 4,018,750 and 4,123,436; or by transesterification processes such as are disclosed in U.S. 3,154,008, as well as other processes known to those skilled in the art.

Poly(ester-carbonate) resin usually employed may generally be described as polymers comprising recurring carbonate groups,

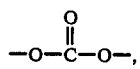

carboxylate groups,

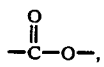

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) polymers in general, are prepared by reacting an aromatic difunctional carboxylic acid or ester forming derivative, a dihydric phenol and a carbonate precursor.

The preparation of poly(ester-carbonates) which may be employed in the compositions of the present invention is described in U.S. Pat. Nos. 3,030,331; 3,169,121; 3,207,814; 4,194,038 and 4,156,069 incorporated herein by reference.

The poly(ester-carbonates) which are preferred in the practice of the present invention include the aromatic polyestercarbonates derived from dihydric phenols, aromatic dicarboxylic acids or their reactive ester forming derivatives such as the aromatic diacid halides, and phosgene. A particularly useful class of aromatic poly(ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, the remainder of the copolymer ester units preferably comprising isophthalate units is generally from about 2 to about 90 percent, and preferably from about 5 to about 25 percent.

Polyarylate resin employed herein is aromatic polyester containing carboxylate groups,

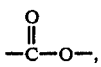

and aromatic carbocyclic groups in the linear po chain, in which at least some of the carboxylate groups join directly ring carbon atoms of the aromatic carbocyclic groups. The polyarylate polymers, in general, are prepared by reacting a aromatic difunctional carboxylic acid or ester forming derivative thereof, and a dihydric phenol. Of course, polyarylates may be polymerized from a carboxylic acid/hydroxy functional monomer in a head-tail arrangement.

A preferred polyarylate contains a dihydric phenol and a difunctional carboxylic acid. The difunctional carboxylic acid portion contains from about 95 to 0 mole percent of terephthalic acid and from about 5 to about 100 mole percent of isophthalic acid. More preferably, such polyarylates contain a mixture of from about 30 to about 70 mole percent terephthalic acid and from about 70 to about 30 mole percent of isophthalic acid. A polyarylate containing a mixture of 50 mole percent of terephthalic acid and 50 mole percent isophthalic acid is common. In general, these and other suitable polyarylates have a reduced viscosity of from about 0.4 to about 1.0 as measured in p-chlorophenol at 49° C. (0.2 g/100 ml.).

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of dihydric phenol. These processes are described in, for example, U.S. Pat. Nos. 3,317,464; 3,948,856; 3,780,148; 3,824,213 and 3,133,898.

Typical dihydric phenols useful in formulating the polycarbonate, poly(ester-carbonate), or polyarylate resins as described above may be represented by the general formula:

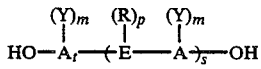 I in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, and generally from one to twelve carbon atoms, inclusive, etc. Where E is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms, inclusive, such as cyclohexylidene; a sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.); aryl (phenyl, naphthyl, etc.); aralkyl (benzyl, ethylphenyl, etc.); or cycloaliphatic of five to seven carbon atoms, inclusive (cyclopentyl, cyclohexyl, etc.). Y may be an inorganic atom such as chlorine, bromine, fluorine, etc; an organic group such as the nitro group, etc.; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;

2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxy-naphthalenes such as 2,6-dihydroxynaphthalene, etc.

Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; bis-(3,5-dimethyl-4-hydroxyphenyl)sulfone; 5'-chloro-2,4'-dihydroxydiphenyl sulfone; 3-chloro-bis-(4-hydroxyphenyl) sulfone; and 4,4'dihydroxytriphenyldisulfone; etc. The preparation of these and other useful sulfones are described in U.S. Pat. 2,288,282. Hydroxy terminated polysulfones as well as substituted sulfones using halogen, nitrogen, alkyl radicals, etc., are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether; 4,4'-dihydroxypentaphenyl ether;
4,4'-dihhydroxy-2,6-dimethoxydiphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included. Other dihydric phenols which are suitable for the preparation of the above described polymers are disclosed in U.S. Pat. Nos. 2,999,835; 3,028,365; 3,334,154; 4,131,575.

In general, any aromatic difunctional carboxylic acid or its reactive derivative, such as acid halide, conventionally used in the preparation of polyesters, may be used for the preparation of the poly(ester-carbonates) or polyarylates described above. The difunctional aromatic carboxylic acids which may be used include the aliphatic-aromatic carboxylic acids, nn addition to the wholly aromatic carboxylic acids. Of course, skilled practitioners will recognize that some small percentage by number of the difunctional carboxylic acid may be difunctional aliphatic carboxylic acid. However, the use of such aliphatic carboxylic acid should not be to such a degree that desirable characteristics associated with aromatic carboxylic acids are substantially reduced. The aromatic dicarboxylic acids or their reactive derivatives, such as the aromatic diacid halides, produce poly(ester-carbonate) and polyarylate which are most useful from the standpoint of physical properties.

The aromatic difunctional carboxylic acids may be represented by the general formula:

$$HOOC-R^1-COOH \qquad II$$

wherein $R^1$ represents an aromatic radical such a phenylene, naphthylene, biphenylene, substituted phenylene, etc.; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, $R^1$ is an aromatic radical such as phenylene, biphenylene, naphthylene, substituted phenylene, etc. Some nonlimiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m- and p-phenylenediacetic acid, and the polynuclear aromatic acids such as diphenyl dicarboxylic acid, and isomeric naphthalene dicarboxylic acids. The aromatics may be substituted with Y groups in the same manner as the Formula I aromatics are substituted. Of course, these acids may be used individually or as mixtures of two or more different acids.

The carbonate precursor used above to produce the polycarbonate or poly(ester-carbonate) resins may be either a carbonyl halide, a carbonate ester, or a haloformate. The carbonyl halides which can be employed herein are carbonyl chlorides and carbonyl bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc., or glycols such as bis-haloformates of ethylene glycol, neopentyl glycol, polyethylene glycol, etc. While other carbonate precursors will occur to those skilled in the art, carbonyl chloride, also known as phosgene, is preferred.

Polyamides suitable for the preparation of the amorphous polyamides of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example, an ester or acid chloride. The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the -CO-NH- group in the case of a lactam. As particular examples of aminocarboxylic acids and lactams there may be mentioned: aminocaproic acid, butyrolactam, pivalolactam, caprolactam, capryllactam, enantholactam, undecanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, those represented by the general formula:

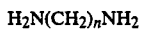

$H_2N(CH_2)_nNH_2$ wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, para-phenylene diamine, meta-xylene diamine, para-xylene diamine, and the like.

The dicarboxylic acids may be aromatic, for example as described in Formula II above or aliphthalic dicarboxylic acids of the formula:

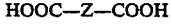

HOOC—Z—COOH wherein Z represents a divalent aliphatic group containing at least 2 carbon atoms. Examples of such acids are sebacic acid, octadecanedoic acid, suberic acid, glutaric acid, pimelic acid and adipic acid.

Typical examples of the polyamides or nylons, as these are often called, include for example, copolymers of polyamides 6, 6/6, 11, 12, 6/3, 6/4, 6/10 or 6/12; polyamides resulting from terephthalic acid and/or isophthalic acid and trimethyl hexamethylene diamine; polyamides resulting from adipic acid and meta xylylenediamines; polyamides resulting from adipic acid, azelaic acid and 2,2-bis-(p-aminocyclohexyl)propane; and polyamides resulting from terephthalic acid and 4,4'-diaminodicyclohexylmethane. Mixtures and/or copolymers of two or more of the foregoing polyamides or prepolymers thereof, respectively, are also within the scope of the present invention.

It is also to be understood that the use of the term "polyamides" herein and in the appended claims is intended to include the toughened or super tough polyamides. Super tough polyamides, or super tough nylons, as they are more commonly known, are available commercially, e.g. from E. I. DuPont under the tradename Zytel ST, or may be prepared in accordance with a number of U.S. patents including, among others, Epstein—U.S. Pat. No. 4,174,358; Novak U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

In general, it is true that all polyamides have both a crystalline and an amorphous state. However, as a practical matter, it is difficult to obtain many of the polyamides in the amorphous state. Symmetrical, hydrogen-bonded, linear polyamides are, invariably, highly crystalline with well defined x-ray patterns. Thus, it is difficult to avoid high degrees of crystallinity with polymers, e.g., nylon-6,6; -6,10; and -6, whose regular structures permit good chain alignment and high degrees of hydrogen bonding in the planes of the chains. Chain stiffness also contributes to crystallinity, rendering hydrogen bonding unnecessary for crystallinity where chain stiffness and symmetry are sufficiently high. Ring-containing polyamides, especially aromatic ring-containing polyamides such as polyterephthalamides, have high stiffness and tend to crystallinity. Thus, it is within the skill of persons knowledgeable in the art to produce amorphous polyamide through any one or a combination of several methods. Faster polyamide melt cooling tends to result in an increasingly amorphous resin. Side chain substitutions on the polymer backbone, such as the use of a methyl group to disrupt regularity and hydrogen bonding, may be employed. Non-symmetric monomers, for instance, odd-chain diamines or diacids and meta aromatic substitution, may prevent crystallization. Symmetry may also be disrupted through copolymerization, that is, using more than one diamine, diacid or monoamino-monocarboxylic acid to disrupt regularity. In the case of copolymerization, monomers which normally may be polymerized to produce crystalline homopolymer polyamides, for instance, nylon 6; 6/6; 11; 12; 6/3; 6/4; 6/10; or 6/12, may be copolymerized to produce a random amorphous copolymer. Amorphous polyamides for use herein are generally transparent with no distinct melting point, and the heat of fusion is about 1 cal/gram or less. The heat of fusion may be conveniently determined by use of a differential scanning calorimeter (DSC).

Blends of amorphous polyamide with polycarbonate, poly(ester-carbonate) and/or polyarylate in any proportion will at least in some degree exhibit characteristics embodying the present invention. However, as a practical matter, the benefits of such blend will not be measurably significant outside a weight ratio of from about 1/49 to about 49/1 amorphous polyamide to total polycarbonate, poly(ester-carbonate) and/or polyarylate content. Preferably, this ratio is between about 1/9 to about 9/1.

Of course, the blends herein may contain other thermoplastic resins, various impact modifiers, stabilizers, flame retardants, mold release agents, reinforcing agents, pigments, and the like. Examples of other thermoplastic resins include poly(etherimides), polysulfones, polyphenylene oxides, and the like. Generally, such other thermoplastic resins should not constitute greater than 80% by weight of total thermoplastic content. Many additives are widely used and recognized as suitable for use herein.

The thermoplastic blends of the present invention are simply prepared by standard techniques; for example, by simple melt blending or dry mixing and melt extruding at an elevated temperature. The extruded admixture is then molded into a piece of specific dimensions or further extruded into a film or sheet product.

475° F. Solvent resistance for these compression molded samples was determined by measuring critical strains, $E_0$, using a Bergen elliptical strain jig and the procedure described by Kambour, et al., (*Macromolecules* 5, 335, 1972). Results are summarized in Table III.

TABLE I

| Molding Conditions | Examples | | | | | | | |
|---|---|---|---|---|---|---|---|---|
| | 1 | 2 | 3 | 4 | 5 | 6 | 7 | 8 |
| Cylinder Temperature (°F.) | | | | | | | | |
| Rear | 500 | 500 | 525 | 525 | 525 | 525 | 535 | 535 |
| Mid | 500 | 500 | 525 | 525 | 525 | 525 | 530 | 530 |
| Nozzel | 500 | 500 | 525 | 525 | 525 | 525 | 525 | 525 |
| Mold Temperature (°F.) | 170 | 170 | 170 | 170 | 170 | 170 | 170 | 170 |
| Injection Pressure (psi) | 1500 | 1500 | 1500 | 1500 | 1500 | 1500 | 1500 | 1500 |
| Total Injection Time (sec) | 10 | 10 | 10 | 10 | 10 | 10 | 10 | 10 |
| Cool Time (sec) | 10 | 10 | 10 | 10 | 10 | 10 | 10 | 10 |

TABLE II

| | Examples | | | | | | | |
|---|---|---|---|---|---|---|---|---|
| | 1 | 2 | 3 | 4 | 5 | 6 | 7 | 8 |
| Composition Weight % | | | | | | | | |
| polycarbonate | 75 | 75 | 80 | 75 | 80 | 75 | 80 | 75 |
| nylon 6(3),T[1] | 25 | | | | | | | |
| nylon 6,I,T[2] | | 25 | | | | | | |
| ST901L resin[3] | | | 20 | 25 | | | | |
| Bexloy APC 803 resin[4] | | | | | 20 | 25 | | |
| nylon 6,I | | | | | | | 20 | 25 |
| Properties | | | | | | | | |
| Tensile Strength (psi) | | | | | | | | |
| Yield | 10,400 | 10,500 | 9,200 | 9,300 | 9,000 | 9,000 | 10,100 | 10,200 |
| Break | 8,500 | 7,700 | 9,200 | 7,600 | 7,200 | 7,400 | 7,900 | 8,000 |
| Elongation (%) | | | | | | | | |
| Yield | 6.0 | 6.4 | 5.8 | 5.8 | 5.8 | 5.8 | 5.7 | 5.8 |
| Break | 43.2 | 46.7 | 77.8 | 45.8 | 14.4 | 13.3 | 30.6 | 49.5 |
| Notched Izod Impact (ft-lbs/in) | .80 | 1.57 | 1.22 | 1.04 | 1.09 | .85 | .99 | 1.02 |
| HDT @ 66 psi (°F.) | 268.0 | 277.2 | 275.5 | 278.1 | 279.4 | 272.3 | 273.0 | 273.3 |

[1]Trogamid T resin, amorphous polyamide; Dynamit Nobel
[2]ZYTEL 330 resin, amorphous polyamide; E. I. DuPont
[3]E. I. DuPont, amorphous polyamide containing rubber impact modifier
[4]E. I. DuPont, amorphous polyamide containing rubber impact modifier

DESCRIPTION OF SPECIFIC EMBODIMENTS

Further illustration of this invention is set forth in the following examples. There is no intention to limit the scope of the invention to merely what is shown.

EXAMPLES 1-8

Blends of polycarbonate (Lexan 131 resin manufactured by General Electric Company, i.v.=0.595 -0.640 dl/g in methylene chloride at 25° C.) and a series of amorphous nylons were prepared on a Werner Pfleiderer ZSK-28 twin screw extruder at temperatures ranging from 565°-585° F., the resins having been dried for 5-10 hours at 110° C. in a air circulating oven. These blends also contained 0.2 phr of ERL-4221 epoxy, a cycloaliphatic diepoxide commercially available from Union Carbide Corporation. The pelletized products were dried in an air circulating oven at 110° C. for 10 hours and then injection molded into ASTM test specimens on a 75 ton Newbury injection molding machine (temperatures shown in Table I). Physical properties were measured according to standard ASTM test procedures (Table II). Compression molded plaques (1/16 inch thick) were also prepared on a hydraulic press at

TABLE III

| Example | Critical Strain (%) | | |
|---|---|---|---|
| | Acetone | Toluene | Gasoline[2] |
| Control A[1] | .19 | .19 | .19 |
| 1 | .62 | .39 | .32 |
| 2 | .80 | .39 | .47 |
| 3 | .52 | .24 | .30 |
| 4 | .55 | .28 | .29 |
| 5 | .55 | .24 | .35 |
| 6 | .59 | .27 | .27 |

[1]Lexan 131 (General Electric)
[2]No lead Gasoline (Amoco)

EXAMPLES 9-10

Lelxan 4701, a poly(ester-carbonate) manufactured by General Electric Company was blended with nylon 6(3), T, Trogamid T resin, and nylon 6, I, T, Zytel 330 resin in a Werner Pfleiderer ZSK-28 twin screw extruder at temperatures ranging from 575°-610° F. These blends also contain 2 phr of ERL-4221 epoxy, a cycloaliphatic diepoxide commercially available from Union Carbide Corporation. Physical properties and molding conditions for these blends are shown in Table IV. Solvent resistance data is summarized in Table C.

TABLE IV

|  | Examples | |
| --- | --- | --- |
|  | 9 | 10 |
| Composition (Weight %) | | |
| poly(ester-carbonate) | 75 | 75 |
| nylon 6(3),T[1] | 25 | |
| nylon 6,I,T[2] | | 25 |
| Properties | | |
| Tensile Strength (psi) | | |
| Yield | 11,100 | 11,400 |
| Break | 8,600 | 8,900 |
| Elongation (%) | | |
| Yield | 7.1 | 7.1 |
| Break | 17.2 | 26.2 |
| Notched Izod Impact (ft-lb/in) | .74 | 1.07 |
| HDT @ 66 psi (°F.) | 317.2 | 322.9 |
| Molding Conditions | | |
| Cylinder Temperatures (°F.) | | |
| Rear | 530 | 525 |
| Mid | 530 | 525 |
| Nozzel | 525 | 525 |
| Mold Temperature (°F.) | 150 | 170 |
| Injection Pressure (psi) | 1500 | 1500 |
| Total Injection Time (sec) | 10 | 10 |
| Cool Time (sec) | 10 | 10 |

[1]Dynamit Nobel, amorphous polyamide
[2]E. I. DuPont, amorphous polyamide

TABLE V

|  | Critical Strain (%) | | |
| --- | --- | --- | --- |
| Example | Acetone | Toluene | Gasoline[2] |
| Control B[1] | .40 | .19 | .28 |
| 9 | .52 | .32 | .65 |
| 10 | .55 | .42 | .65 |

[1]Lexan 4701 resin (General Electric)
[2]No lead Regular Gasoline (Amoco)

EXAMPLES 11-15

Polycarbonate (Lexan 141 resin, manufactured by General Electric Company, i.v.=0.595–0.640 in methylene chloride at 25° C.) and nylon 6, I were blended in a Haake Platometer at 250° C. at 64 rpm in batches whose compositions are shown on Table VI. Samples were taken immediately after full melt was achieved and again after 20 minutes. Intrinsic viscosities were measured for each sample, and weight losses after polycarbonate resin extraction overnight in methylene chloride are indicated on Table VI.

TABLE VI

| Composition | Examples | | | | |
| --- | --- | --- | --- | --- | --- |
| Weight Percent | 11 | 12 | 13 | 14 | 15 |
| Polycarbonate | 1 | 25 | 50 | 75 | 99 |
| Nylon 6,I | | | | | |
| Initial i.v. | 1.1 | 1.05 | .72 | .66 | .50 |
| 20 Min i.v. | .9 | .9 | .58 | .5 | .41 |
| Weight Loss (%) | 5 | 32 | 68 | 81 | 100 |

What is claimed is:

1. A blend of thermoplastic resins consisting essentially of:
   (i) at least one aromatic polycarbonate resin; and
   (ii) at least one amorphous polyamide resin having no distinct melting point.

2. The blend of claim 1 which contains a weight ratio of from about 49/1 to about 1/49 amorphous polyamide to total polycarbonate content.

3. The blend of claim 2 wherein said ratio is about 9/1 to about 1 to 9.

4. The blend of claim 1 wherein said amorphous polyamide is substantially transparent.

5. The blend of claim 1 wherein said amorphous polyamide has a heat of fusion of about 1 cal-gram or less.

6. The blend of claim 1 wherein said amorphous polyamide has side chain substitution.

7. The blend of claim 1 wherein aid polyamide is polymerized from monomers comprising non-symmetric monomers.

8. The blend of claim 7 wherein said non-symmetric monomers comprise meta aromatic diamines and diacids.

9. The blend of claim 1 wherein said polyamide is a opolymer of at least one nylon selected from the roup consisting of nylon 6, 6/6, 11, 12, 6/3, 6/4, 6/10 and 6/12.

10. A method for preparing a thermoplastic blend consisting essentially of:
   (i) melt blending thermoplastic resins comprising polyamide and at least one aromatic polycarbonate; and
   (ii) cooling the resultant resin melt at a sufficient rate effective to produce an amorphous polyamide phaes, the amorphous polyamide having no distinct melting point.

* * * * *